Oct. 14, 1969 N. B. SYKES ET AL 3,472,290
METHOD OF AND APPARATUS FOR DIVIDING LENGTHS OF SPRING
UNIT FOR USE IN MATTRESSES AND THE LIKE
Filed June 5, 1967 8 Sheets-Sheet 7

Oct. 14, 1969  N. B. SYKES ET AL  3,472,290
METHOD OF AND APPARATUS FOR DIVIDING LENGTHS OF SPRING
UNIT FOR USE IN MATTRESSES AND THE LIKE
Filed June 5, 1967  8 Sheets-Sheet 8

United States Patent Office 3,472,290
Patented Oct. 14, 1969

3,472,290
METHOD OF AND APPARATUS FOR DIVIDING LENGTHS OF SPRING UNIT FOR USE IN MATTRESSES AND THE LIKE
Neville B. Sykes, Romiley, and Lawrence Holland, Hazel Green, England, assignors to Multilastic Limited, Brierley Hill, Staffordshire, England, a British company
Filed June 5, 1967, Ser. No. 643,463
Claims priority, application Great Britain, June 3, 1966, 24,808/66
Int. Cl. B21f 27/16
U.S. Cl. 140—3                              9 Claims

ABSTRACT OF THE DISCLOSURE

Spring material to be severed for forming spring interiors comprises bands of springs secured side-by-side, each band being a piece of wire bent to form a row of coil springs joined by connectors, each connector extending along one edge face of the band. Severing apparatus comprises pairs of abutments defining grooves for the connectors. The abutments of each pair are offset lengthwise of their groove, and have an associated pair of heads movable across the ends of the groove to bend a connector in the groove into step-like shape and then to sever the connector between the abutments.

---

This invention relates to apparatus for dividing lengths of spring material to form individual spring units such as may be used as the spring interiors for mattresses, seats and the like.

The invention is particularly concerned with apparatus for dividing lengths of spring material of a known kind (hereinafter referred to as the kind specified) which comprises a plurality of bands of wire springs which extend lengthwise of the material and are secured together in side-by-side relationship, the material having two parallel main faces defined by the edge faces of the bands, and each band comprising a length of resilient wire bent to form both a plurality of coil springs, disposed side-by-side in a row, and extending from one edge of the band to the other and a plurality of connectors, each connector serving to interconnect the ends of two adjacent springs in the row, extending lengthwise of the row, and being at an edge face of the band.

Spring material of the kind specified is described in Austrian Patent No. 206,147 in the name of Willi Gerstorfer.

Spring material of the kind specified can be made in long lengths by pre-forming a plurality of the component bands of springs, and securing these bands together side-by-side. A particularly convenient method of securing the bands together makes use of helical wires, of considerably smaller overall diameter than the diameter of the springs which constitute the main parts of the bands. Each helical wire extends transversely of the material and embraces parts of all of the bands. Helical wires are added successively so that the material grows continuously in length. Spring units can then be formed by dividing the formed material into relatively short pieces. The necessary division is best effected by severing the connectors of the bands rather than the springs. In dividing a length of spring material one connector in each band is severed.

It is the usual practice to secure a spring unit, severed from a length of spring material, to at least one peripheral frame which may serve to stiffen the edge of the unit. Such a frame usually comprises a length of metal strip bent into rectangular or other appropriate form and having its ends secured together. The frame lies in the plane of one of the main faces of the unit and is secured to it by a plurality of ties disposed at spaced positions around the frame, each tie embracing the frame and an adjacent wire or adjacent wires constitute part of the unit. There is normally no difficulty in securing the frame to the side edges of the unit as wire parts suitable for attachment to the ties may be afforded by the connectors and the end coils of the springs. At the ends of the units, however, there is usually greater difficulty, particularly at that edge adjacent to the ends of the severed connectors. In order to provide suitable anchorages for the ties the end portions of the severed connectors are bent so that they extend substantially parallel to the adjacent part of the periphery of the unit. Further, in order to prevent a tie which embraces such an anchorage from slipping from the free end of the anchorage the tip of the anchorage is bent at an angle to the remainder so that the tip then constitutes a stop.

The principal object of the invention is to provide apparatus for dividing lengths of spring material by severing the connectors, and also forming attachment anchorages and stops at the ends of the severed connectors.

Other objects achieved by the invention will become apparent as the description of the apparatus progresses.

According to the present invention there is provided apparatus for use in dividing lengths of spring material of the kind comprising a plurality of bands of wire springs which extend lengthwise of the material and are secured together in side-by-side relationship, the material having two, parallel main faces defined by the edge faces of the bands, and each band comprising a length of resilient wire bent to form both a plurality of coil springs, disposed side-by-side in a row and extending from one edge of the band to the other, and a plurality of connectors, each connector serving to interconnect the ends of two adjacent springs in the row, extending lengthwise of the row, and being at an edge face of the band, the apparatus comprising a row of abutments arranged in pairs, each pair defining a groove for receiving an associated connector of the spring material, and the abutments of each pair being longitudinally offset with respect to the groove, and a pair of bending and severing heads associated one with each pair of abutments and movable in opposite directions across the ends of the groove to bend a connector extending through the groove into step-like shape, each head carrying a cutter such that cutters of each pair of heads co-operate, after the bending operation, to sever the wire in the associated groove between the abutments, the end portions of each severed connector thus comprising an anchorage extending transversely of the band terminating in a stop transverse to the anchorage.

The invention will now be more particularly described with reference to the accompanying drawings in which.

Figure 1:
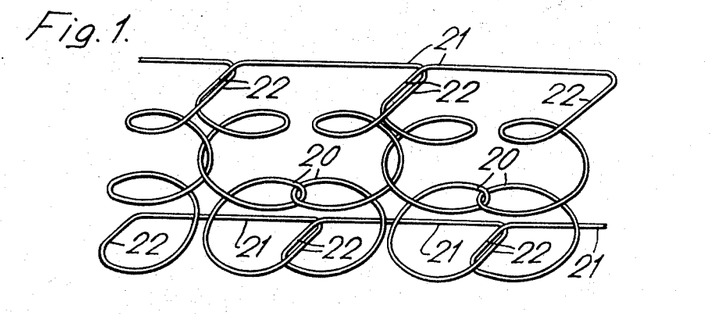
FIGURE 1 is a perspective view of a band of springs constituting part of a length of spring material which is to be severed by apparatus in accordance with the invention.
Figure 4:
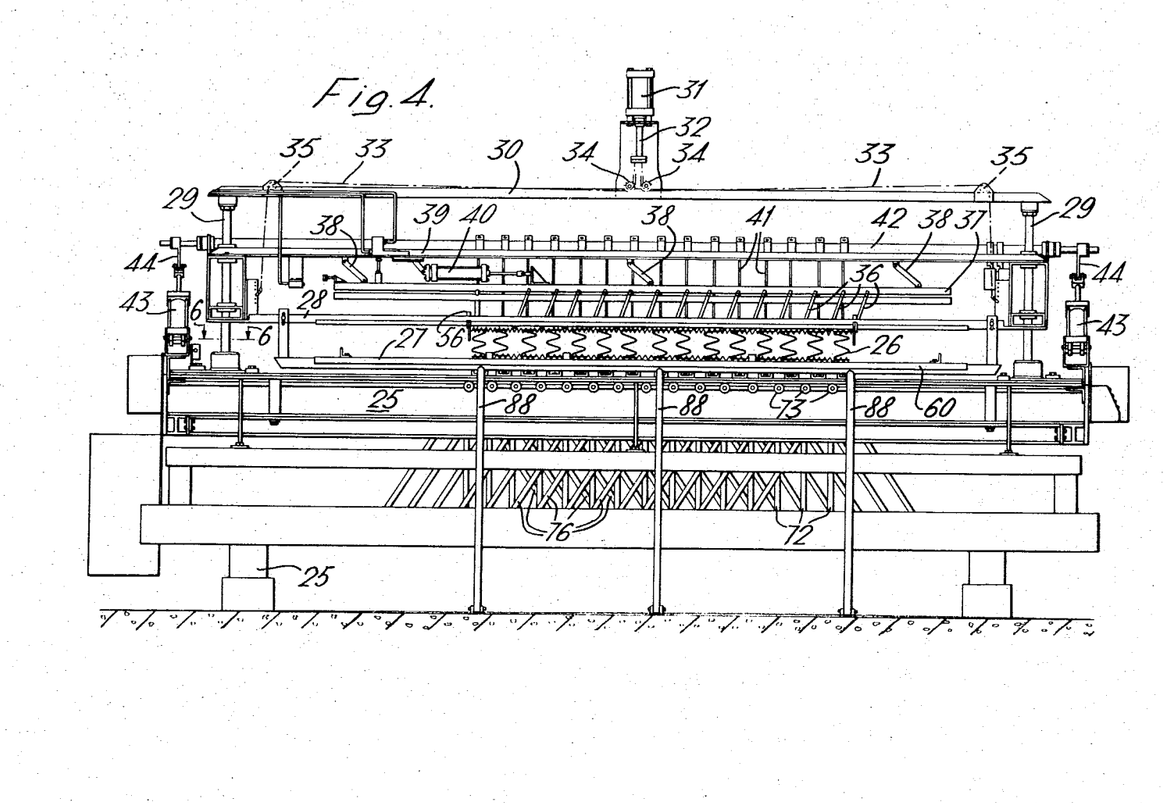
FIGURE 4 is a front view of apparatus in accordance with the present invention.

The apparatus illustrated in FIGURE 4 is intended for use in dividing lengths of spring material of a known kind. The spring material is made from bands of wire springs, the bands all being similar to one another. Part of one band is shown in FIGURE 1. The band is formed from a single length of resilient wire bent to form a plurality of coil springs 20, disposed side-by-side in a row and extending from one edge of the band to the other, and a plurality of connectors 21, each connector serving to interconnect two adjacent springs in the row. Successive springs 20 in the band are alternately left and right handed, and each spring is coupled to the next by having one turn thereof passed round the adjacent turn in the spring to one side of it. The connectors 21 extend lengthwise of the row, and are at the top and bottom edge faces of the band.

In the assembled material the band is linked to other similar bands by helical wires which extend transversely of the material. The helical wires are of considerably smaller overall diameter than the diameter of the springs 20. The helical wires are not shown in FIGURE 1 but, when present, embrace the end portions 22 of the springs which are immediately adjacent to the connectors 21. Each helical wire embraces two closely adjacent end portions 22 in each band. The helical wires are thus spaced apart along the band and successive helical wires along the band are at alternate top and bottom edges of the band.

Figure 2:
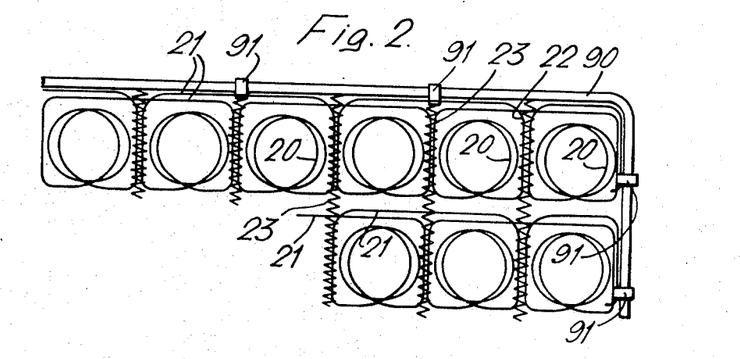
FIGURE 2 is a somewhat diagrammatic plan view of one corner of a spring unit incorporating bands of the kind shown in FIGURE 1, and provided with a peripheral frame.
Figure 3:
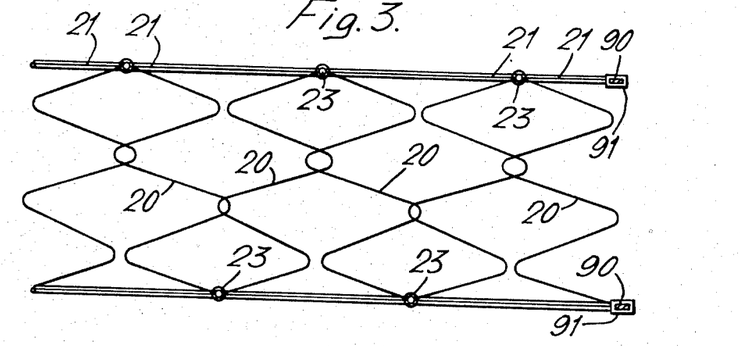
FIGURE 3 is a somewhat diagrammatic side view of the part of the spring unit shown in FIGURE 2.

FIGURE 2 shows a corner of a spring unit incorporating bands of the kind shown in FIGURE 1, but for clarity the springs are not shown as being coupled together. In FIGURE 3, however, the springs are again shown as being coupled together.

In FIGURES 2 and 3 the bands have the same reference numerals as are given to the band shown in FIGURE 1. The bands are linked by helical wires 23 arranged as described above. Each helical wire 23 is of relatively small pitch and diameter as compared with the springs 20. In addition to linking neighboring bands each helical wire 23 also links the end portions 22 of adjacent springs 20 in each band, which end portions are susbtantially straight and extend transversely across the edge face of the band of which they form a part.

The apparatus which is the subject of the invention assists in the division of lengths of spring material, and cuts one of the connectors 21 in each band. In order that the pieces of spring material on each side of the severed connectors can be separated the helical wire 23 opposite to the severed connectors is either omitted during manufacture of the material or is removed, preferably before the helical wires are severed. Also the springs on each side of the severed connector are uncoupled. This uncoupling is effected by the apparatus as described below.

The apparatus comprises a fixed stand 25 extending transversely of the length of spring material which is to be divided, such material being indicated at 26. As described below in greater detail mechanism is mounted on the top of the stand 25 for bending and severing the connectors on the lower main face of the length of material opposite to the place from which a helical wire is omitted. In order to prevent the spring material from fouling this mechanism as the unit passes over the stand 25 the material is normally supported a little above the level of the mechanism on a pair of sheet metal support strips 27 close to and parallel with the stand and disposed one on each side of it. The support strips are connected at their ends to a frame 28 extending over the stand 25 and guided for vertical movement on a pair of upstanding rods 29 mounted one at each end of the stand. A fixed, horizontal cross bar 30 joins the upper ends of the rods 29 above the frame, and supports at its centre a pneumatic piston and cylinder unit 31 with a vertically movable piston with a piston rod 32. One end of each of a pair of chains 33 is connected to the piston rod 32 and the chains extend downwards from the piston rod, round a pair of sprocket wheels 34 and then horizontally one in either direction, to the ends of the cross bar 30, where they pass over a second pair of sprocket wheels 35 and extend downwards again to where their ends are connected to the frame 28. In use the piston and frame are normally in their up positions (as illustrated in FIGURE 4) so that the length of spring material 26 rests on the support strips 27 and clears the bending and severing mechanism. When the piston of the unit 31 is allowed to drop, under the weight of the frame 28, the support strips 27 are lowered so that the spring material rests on the mechanism. The frame 28 then continues its downward movement and in doing so it brings separating mechanism on the upper part of the frame, above the length of spring material, into engagement with the upper parts of the length of spring material.

Figure 5:
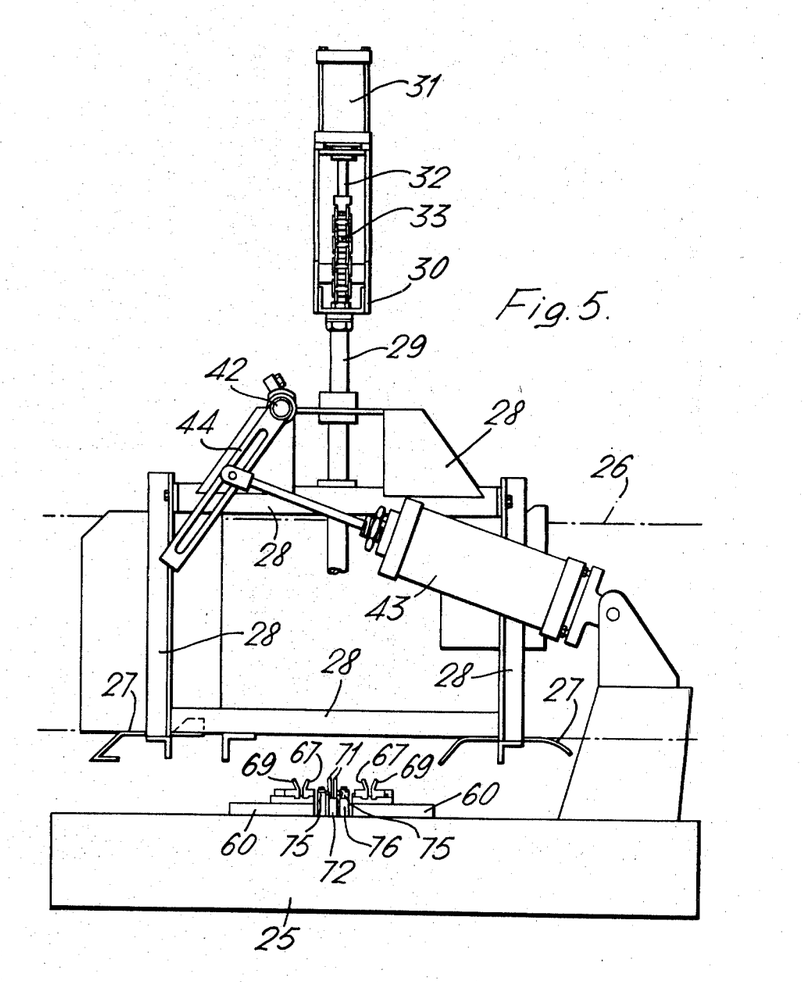
FIGURE 5 is an end-view, to a larger scale, of the upper part of the apparatus shown in FIGURE 4, as seen from the left of FIGURE 4, certain parts being omitted for clarity.

The separating mechanism serves to uncouple the springs on either side of the place from which the helical wire is omitted. The mechanism comprises two sets of fingers both sets mounted on the frame 28 for movement relative to the frame. The first set of fingers comprises a plurality of parallel, generally upright rods 36 each pointed at its lower end and supported at its upper end on a horizontal support bar 37 parallel with the stand 25 and the cross bar 30. The rods 36 are spaced apart at equal intervals and one is associated with each band of springs in the length of spring material to be divided. The support bar 37 is connected by relatively short parallel links 38 to another horizontal bar 39 constituting part of the frame. A pneumatic piston and cylinder unit 40 acts between the frame bar 39 and the support bar 37 to move the support bar and the first set of fingers 36 relatively to the frame bar. In its normal position (as illustrated in FIGURE 4) the support bar lies a short way below the frame bar 39, but when the piston and cylinder unit 40 is operated it swings in an arcuate path downwards and lengthwise relative to the frame bar 39. The first set of fingers 36 is disposed a little to one side of the plane in which division of the length of spring unit occurs, being on the output side of the apparatus. A second set of fingers 41 is disposed on the other side of the plane in which division occurs. The fingers 41 are mounted on a horizontal shaft 42, parallel with the stand 25, pivotally mounted on the frame 28. The fingers 41 comprise short metal bars, spaced at equal intervals along the shaft 42, one being associated with each band of springs. The shaft is rotatable through part of a revolution by a pair of pneumatic piston and cylinder units 43, the cylinders being pivotally mounted one at each end of the stand 25, and the rods of the pistons being pivotally connected to radial arms 44 secured to the ends of the shaft. In the normal position (as illustrated in FIGURES 4 and 5) the second set of fingers 41 extend downwards and rearwards, that is in a direction opposite to the direction of feed of the spring material, and in the operative position the set of fingers 41 extends downwards and slightly forwards, that is towards the first set of fingers 36.

In use, when the frame 28 is in its up position and the length of spring material 26 rests on the support strips 27, the fingers are above the level of the length of unit. When the frame is lowered, as described above, the fingers 36 and 41 enter the upper part of the material and lie adjacent to wires in the upper main plane of the material. The upper edge of each band of spring wires comprises a series of aligned connectors 21, which are substantially straight and which extend lengthwise of the band, one between each adjacent pair of transverse helical wires 23. The aligned connectors 21 lie to one side of the upper edge of the band, and the bands are so arranged in the unit that all but one of the lines of connectors 21 lie on the same side of their bands so that the lines of conectors are spaced evenly apart across the material. In FIGURE 4 these connectors are at the right hand sides of their bands. The one exception to this arrangement is a band at the left hand side of the material, the arrangement thus being such that there is a line of connectors at each of the extreme sides of the material. Each connector 21 is connected integrally to the end portions 22 of two adjacent springs 20. These end portions 22 are substantially straight and lie in the upper main plane of the material, extending transversely of the material and normal to the connectors 21. The adjacent end portions of two adjacent connectors 21 lie side-by-side and are held together by one of the helical wires 23 which extends around them.

Figure 15:
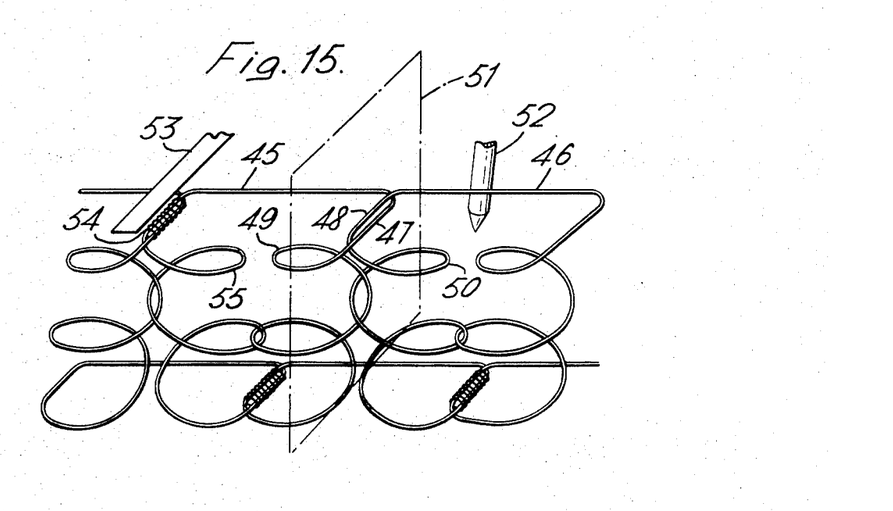
FIGURE 15 is similar to FIGURE 1 but includes components used in uncoupling the springs.

Referring to FIGURE 15, this shows a pair of adjacent connectors 45 and 46 and the end portions 47 and 48 of the springs 49 and 50 to which they are integrally connected, these components forming part of one band of springs of the material 26 and lying one on each side of the plane 51 in which the material is to be divided. The helical wire which would normally have joined the two adjacent end portions 47 and 48 is here omitted. When the frame 28 is lowered and the separating mechanism is operated one finger 52 of the first set 36 and one finger 53 of the second set 41 is used to uncouple the two adjacent springs 49 and 50 on either side of the plane of division 51. The finger 52 of the first set 36, or first finger, is disposed alongside the connector 46 nearer the output side of the apparatus, and on that side of the connector further from the end portion 48 of the spring 50 to which it is connected. The finger 52 lies alongside the spring 50. The finger 53 of the second set 41, or second finger, is disposed by the connector 45 nearer the input side of the apparatus and is adapted to engage the end portion 54 of the spring 55 further from the plane of division 51 which is integrally connected to the connector 45. In use, the second finger 53 pushes the connector 45 and its two springs 55 and 49 towards the plane of division 51, and carries the springs 49 to be uncoupled across the plane of division 51 into the spring 50 on the output side from which it is to be uncoupled. The first finger 52 then moves transversely to push the spring 50 on the output side laterally so that it becomes uncoupled from the spring 49 that has been pushed into it. The second finger 53 then withdraws to its original position so that the springs 49 which crossed the plane of division 51 now returns to substantially its former position due to the resilience of the wire; and finally the first finger 52 returns to its original position and the uncoupled spring 50 on the output side of the plane of division 51 returns to substantially its former position.

At the left hand side of the material as viewed in FIGURE 4 where the orientation of the outermost band is reversed the separating mechanism is modified in that the first finger 56 associated with the band is located on the opposite side of the plane of division and is arranged to push sideways the spring to be uncoupled on the input side of the plane of division rather than the spring to be uncoupled on the output side thereof. Due to the reversal of the band the lateral movement of the spring is in the same direction as that of the other springs which are moved laterally. The first finger associated with the side band is mounted on a bracket secured to the same support bar 37 as the other fingers of the first set.

Figure 6:
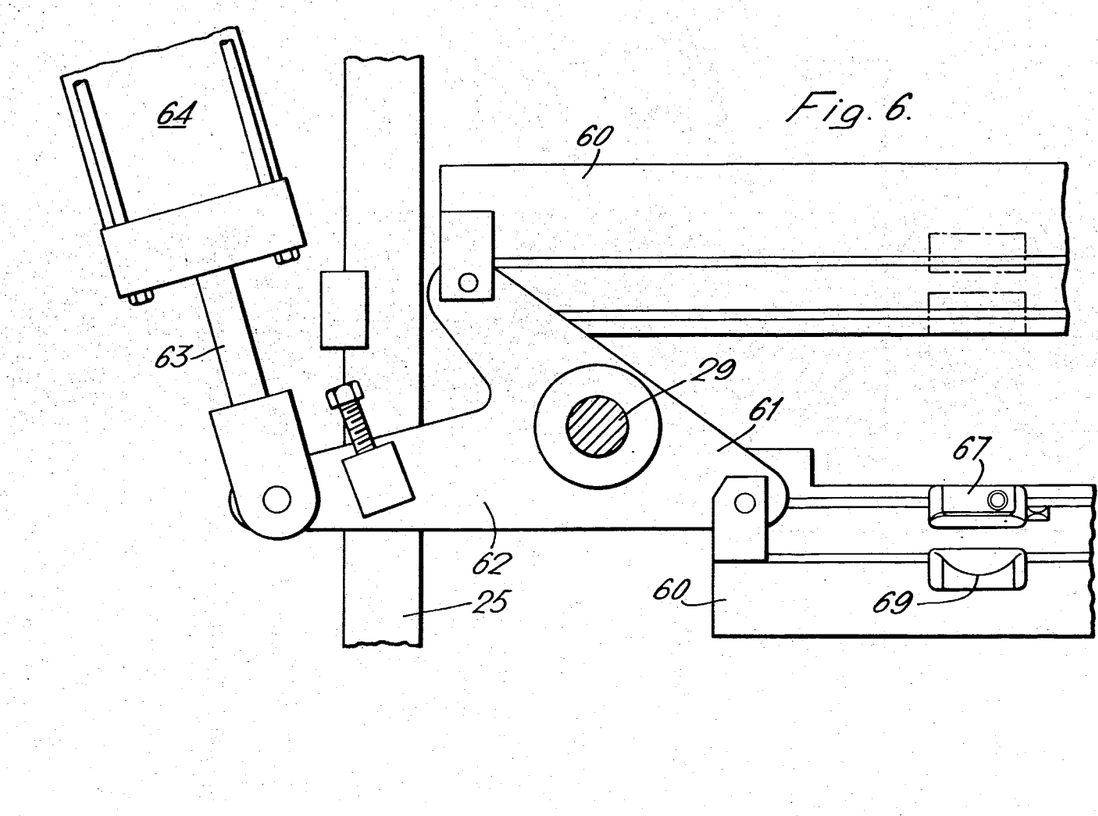
FIGURE 6 is a section, to a larger scale, along the line 6—6 of FIGURE 4.
Figure 10:
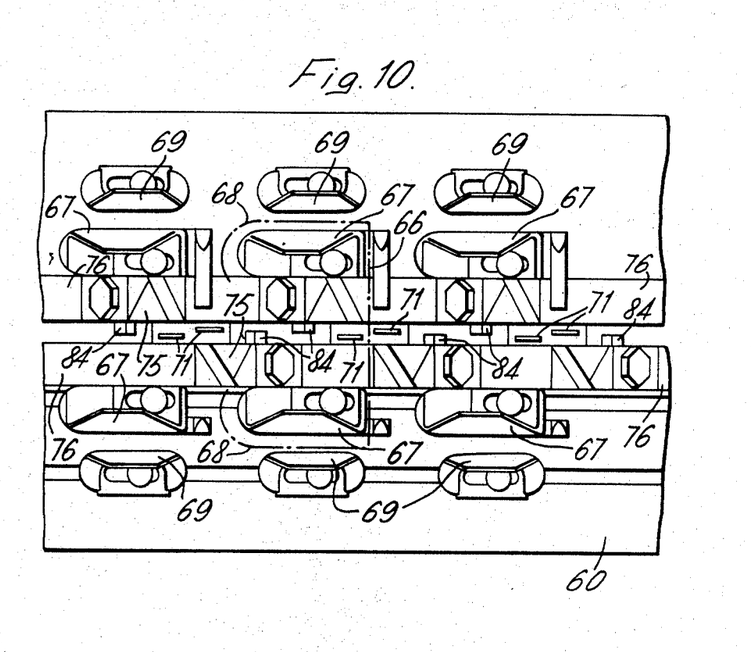
FIGURE 10 is a plan view, to a reduced scale, of several devices similar to that shown in FIGURES 7 and 8, and adjacent parts of the apparatus.

While the separating mechanism is in operation the underside of the length of material 26 adjacent to the plane of division is located on part of the bending and severing mechanism. As best seen in FIGURE 10 this mechanism is in three main parts: at the centre, in a transverse gap between two portions of the stand 25, is the mechanism for severing the connectors and forming attachment anchorages, and on either side is mechanism for locating the material and for lengthening the connectors. The locating and lengthening mechanism is mounted on a pair of slide plates 60, one on either side of the gap and adapted to slide lengthwise along the top of fixed parts of the stand 25 on either side of the gap. The ends of the slide plates 60 are pivotally connected to a pair of parallel, horizontal links, one at each end of the stand, each link being pivoted about a vertical axis at its centre to the lower end of the upstanding rods 29. One of the links 62, shown in FIGURE 6, has an integral lug 62 extending radially outwards from its centre and connected at its outer end to the piston rod 63 of a pneumatic piston and cylinder unit 64, of which the cylinder is pivotally connected to the frame 25. In the normal positions of the slide plates (shown in FIGURES 6 and 10) the links are inclined to the slide plates 60, but when the piston and cylinder unit 64 is operated the links move to positions in which they are substantially at right angles to the slide plates 60 and are thus parallel with the direction of feed of the spring material through the apparatus. In moving from the normal to the operative position the slide plates 60 move apart and longitudinally relative to each other. The locating and lengthening mechanism also included a plurality of locators secured to the upper faces of the slide plates. It will be appreciated that when the length of spring material is in the correct position to be divided one connector at the lower edge of each band of springs extends across the plane of division. The position of the connector 66 of one band is shown in chain-dotted lines in FIGURE 10. As can be seen from FIGURE 10 the ends of each of the connectors extend along grooves in locators 67 on the slide plates 60, and that the substantially straight end portions 68 of the springs to which they are integrally connected extend between the locators 67 and other locators 69 (these are, of course, the springs uncoupled by the mechanism described above).

Figure 11:
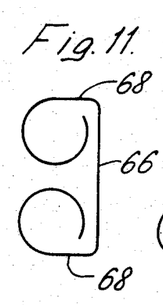
FIGURES 11, 12, 13 and 14 illustrate successive stages in the deformation and severing of a connector by the apparatus shown in FIGURES 4 to 10.
Figure 12:
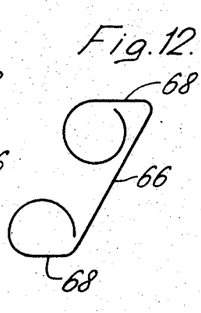

The locators 67 and 69 comprise blocks the lower ends of which are spaced apart just enough to allow the wires to enter between them and lie on the slide plates 60. The upper parts of the locators are tapered, however, so that as the material 26 is lowered onto them any wires slightly out of place engage the inclined sides of the locators and are guided to their correct positions. The wires drop readily into place when the slide plates 60 are in their normal positions. When the slide plates 60 are moved to their operative positions, however, the end portions 68 are moved apart and lengthwise relatively to one another so that the connectors are lengthened at the expense of the springs to which they are connected and, in addition, the lengthened connectors are inclined somewhat to the longitudinal axes of the bands. As the wires are pulled between the connectors they acquire a set such that they would not revert to their original shapes if released. This change in shape is illustrated diagrammatically in FIGURES 11 and 12, FIGURE 11 showing the original shapes of a connector and the lower ends of the associated springs, and FIGURE 12 showing the shape after the slide plates have moved to their operative position.

Figure 7:
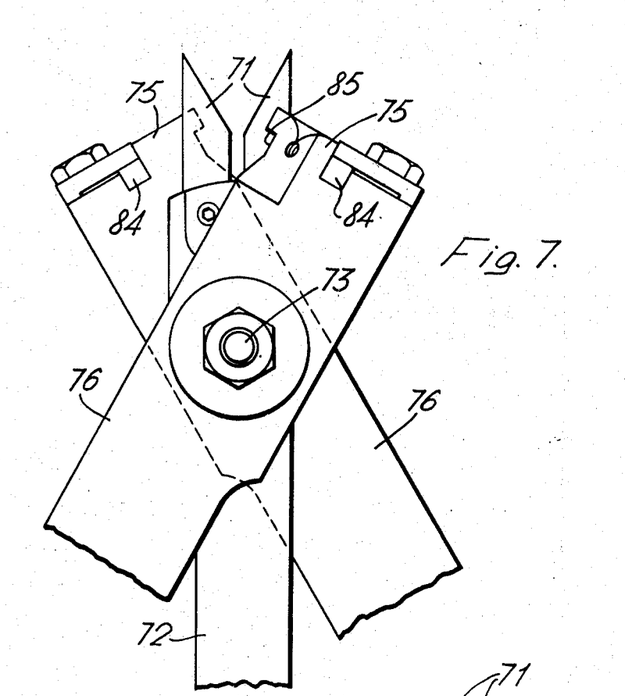
FIGURE 7 is a front elevation, to a larger scale, of the upper part of one of the wire forming and severing devices of which a plurality are included in the apparatus shown in FIGURE 4.
Figure 8:
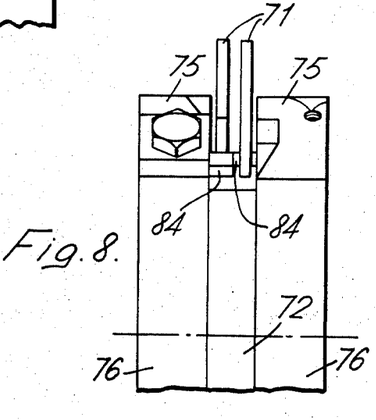
FIGURE 8 is a side elevation of the device shown in FIGURE 7.
Figure 9:
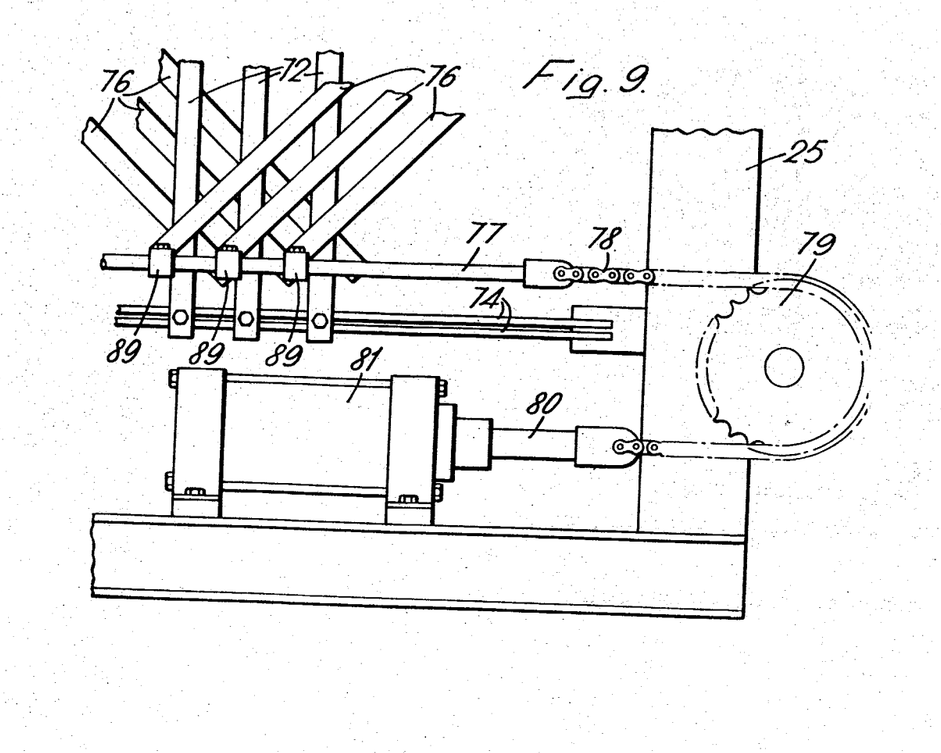
FIGURE 9 is a view, to an enlarged scale, of part of the apparatus shown in FIGURE 4 as viewed from the rear.

The slide plates 60 are operated in this manner to lengthen and incline the connectors immediately after the uncoupling operation is completed. Following these steps the mechanism for severing the connectors and forming the attachment anchorages is caused to operate. This mechanism is located in the gap between the slide plates 60 and comprises fixed abutments and movable jaws which co-operate with the abutments. The top of the mechanism is visible in FIGURE 10 and one of the devises forming part of the mechanism is best seen in FIGURES 7 and 8. The other devises are similar. Each connector to be severed drops between an associated pair of fixed abutments 71 when the spring material is lowered onto the mechanism. The upper ends of the abutments 71 are flared apart so as to assist in locating the connector as it is lowered between them. The abutments 71 are slightly offset longitudinally of the connector as shown in FIGURES 8 and 10. Each pair of abutments 71 is secured in the upper end portion of a bar 72 which extends vertically downwards and is supported a little below the abutment on an associated horizontal pivot pin 73 fixed to the stand 25 and extending in a direction parallel with the connectors, and at its lower end to a pair of spaced horizontal members 74 extending lengthwise of and forming part of the stand 25 as shown in FIGURE 9. A securing bolt passes through the lower end of each bar 72 and between said horizontal members 74. In this way the position of each pair of abutments 71 can be individually adjusted as required. Each connector has associated with it, in addition to the pair of fixed abutments, a pair of movable jaws 75. Each jaw 75 is fixed to the upper end of an arm 76 pivotally mounted on the pivot pin 73. The two jaw arms 76 are mounted one on either side of the abutment bar 72. As shown in FIGURE 9 the lower ends of the jaw arms 76 on one side of the apparatus are pivotally secured to blocks 89 adjustably secured to an associated horizontal rod 77 which lies close to the frame members 74, and the lower ends of the jaw arms on the other side are similarly secured to a second rod. Each of the two rods 77 has a chain 78 connected to one end which extends around a sprocket wheel 79 at the end of the stand 25 and is in turn connected to the horizontally movable piston rod 80 of a pneumatic piston and cylinder unit 81 secured to the base of the stand. The other end of each rod 77 is pivotally secured to the lower end of a link (not shown) parallel with and similar to the jaw arms 76 and pivotally secured to the stand at its upper end. An intermediate part of the link is pivotally connected to the horizontally movable piston rod of a second pneumatic piston and cylinder unit (not shown) mounted on the stand. In use the first unit 81 operates to draw the chain and move the associated jaws 75 to perform their bending and severing operations described below, and subsequently the second unit, which is less powerful, operates to return the jaws to their initial positions.

Figure 13:
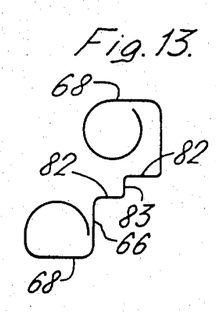
Figure 14:
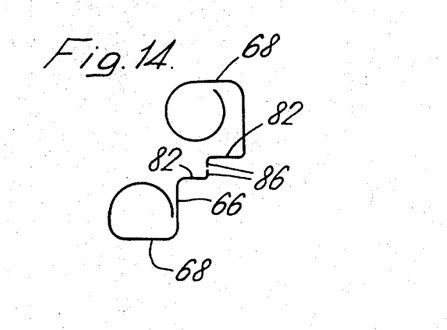

Each jaw 75 is thus movable in a mainly horizontal direction between an initial inoperative position and an operative position. In their inoperative positions, shown in FIGURES 7 and 8 the jaws of each pair lie one on either side of the associated connector. Like the fixed abutments 71 the jaws 75 are offset lengthwise of the connector, but the degree to which they are offset is greater and is such that when the jaws 75 move to their operative positions the abutments lie between the jaws. In moving to its operative position each jaw 75 traps part of the connector in the narrow gap between it and the adjacent abutment 71 and bends the connector so that a short length 82 thereof (see FIGURE 13) in the gap between the jaw 75 and the abutment 71, is at right angles to the longitudinal axis of the band of which it forms a part. These two short 82 lengths constitute attachment anchorages after the division of the length of spring material. Between the attachment anchorages 82 is a short length of wire 83 which extends between the fixed abutments 71 in a direction parallel with the longitudinal axis of the band. Following the formation of the attachment anchorages 82 this short length of wire 83 is severed at its centre by a pair of co-operating cutters 84 mounted on the jaws 75. Each cutter 84 projects from its jaw 75 in a direction parallel with the axis of its pivot 73 and towards the other jaw. The cutter 84 is disposed near the trailing edge of the jaw 75 so that an attachment anchorage 82 of adequate length is formed before the wire is severed as shown in FIGURE 14. The leading edge of each jaw is formed with a notch 85 shaped as shown in FIGURE 7, the notch serving to receive the wire and prevent its escape from the jaw. It will be appreciated that as the attachment anchorages 82 are formed the connector is further lengthened to some extent and that those straight portions of the connector, between the attachment anchorages and the springs, which were initially parallel with the longitudinal axis of the band of which it forms a part, and which were subsequently inclined to this axis, are again carried back to positions in which they are parallel with this axis as can be seen from FIGURES 12 and 13. The short terminal portion of wire 86 on the end of the attachment anchorage 82 after the wire is severed constitutes a stop as described below.

After the connectors have been severed the jaws 75 are returned to their initial positions and the frame 28 is then lifted to raise the divided portions of the length of spring material from the bending and severing mechanism, the ends of the portions being supported one on each of the support strips 27. Finally, after the frame 28 has been raised the slide plates 60 are returned to their initial positions. Thus all the operations performed by the apparatus are completed and the apparatus is ready to divide another part of the length of spring material.

As explained above all of the operations effected by the apparatus are carried out by pneumatic piston and cylinder units. Other forms of power unit, such for example as hydraulic piston and cylinder units or electric motors may, of course, be used if desired. Preferably the arrangement is such that each operation is initiated in response to the completion of the previous operation in the cycle, and to this end each unit may be controlled by a pneumatic switch mounted on the frame and operated by some convenient moving part of the apparatus. The cycle of operations may thus be effected entirely automatically, and may conveniently be initiated from the apparatus used for assembling the spring material. The omission of a helical wire at the assembly apparatus may initiate the operation of the dividing apparatus after a predetermined number of additional helical wires have been added to the material, the number being determined by the distance between the two pieces of apparatus.

The length of spring material formed by the assembly apparatus may be supported on a pair of spaced parallel bars (not shown) pivotally connected at one end to a fixed part of the assembly apparatus and at the other end to the support strip 27 on that side of the dividing apparatus nearer the assembly apparatus. Other similar guide bars 88, pivotally connected to the other support strip, may receive the length of spring material issuing from the dividing apparatus, these guide bars 88 extending away from the apparatus in a horizontal direction and then extending vertically downwards to the floor to which they are pivotally connected.

It will be appreciated from the foregoing description that many of the pieces of mechanism forming part of the dividing apparatus comprise similar groups of components, there being one group for each band. The apparatus is preferably constructed in such a manner that groups can readily be added or removed so that the apparatus can be adapted to divide lengths of spring material of different widths. A single dividing apparatus may in fact be adapted to divide two or more relatively narrow lengths of spring material disposed side-by-side.

FIGURES 2 and 3 show part of a length of spring material which has been severed by the apparatus described above and which has been secured to two peripheral frames 90 which serve to stiffen the edge of the unit of severed material. Each frame 90 comprises a length of metal strip bent into rectangular form with its ends secured together. The frames lie in the planes of the main faces of the unit, and are secured to the unit by strip metal ties 91 disposed at spaced positions around the frames 90 and each embracing the adjacent frame and an adjacent wire constituting part of the unit. As can be seen from FIGURES 2 and 3 the sides of the frame 90 are connected by ties to the adjacent connectors 21, while the end of the lower frame, in FIGURE 3, is connected by ties to the end portions 22 of the adjacent springs. The end of the upper frame, however, is connected by ties to anchorages 82. The stops 83 prevent the anchorages 82 slipping from the ties.

It will be seen from FIGURES 2 and 3 that the ends of the frames 90 are vertically aligned. This is only possible due to the extension of the severed connectors described above and illustrated in FIGURES 11 and 12. Although this extension of the connectors is useful in practice it is not essential to the present invention. Without the extension the attachment anchorages would lie closer to the adjacent springs, and the ends of the peripheral frames would not be in true vertical alignment.

We claim:

1. Apparatus for use in dividing lengths of spring material of the kind comprising a plurality of bands of wire springs which extend lengthwise of the material and are secured together in side-by-side relationship, the material having two, parallel main faces defined by the edge faces of the bands, and each band comprising a length of resilient wire bent to form both plurality of coil springs disposed side-by-side in a row and extending from one edge of the band to the other, and a plurality of connectors, each connector serving to interconnect the ends of two adjacent springs in the row, extending lengthwise of the row, and being at an edge face of the band, the apparatus comprising a row of abutments arranged in pairs, each pair defining a groove for receiving an associated connector of the spring material, and the abutments of each pair being lonigtudinally offset with respect to the groove, and a pair of bending and severing heads associated one with each pair of abutments and movable in opposite directions across the ends of the groove to bend a connector extending through the groove into step-like shape, each head carrying a cutter such that cutters of each pair of heads co-operate, after the bending operation, to sever the wire in the associated groove between the abutments, the end portion of each severed connector thus comprising an anchorage extending transversely of the band terminating in a stop transverse to the anchorage.

2. Apparatus according to claim 1 in which each bending and severing head is on an arm, each pair of arms being mounted for pivotal movement about a common axis parallel with the associated groove.

3. Apparatus according to claim 1 in which the abutments are mounted on bars located between said arms and are located by pivot pins on which said arms are pivotally mounted, the bars being adjustably secured at positions remote from the abutments and pivot pins.

4. Apparatus according to claim 1 in which each bending and severing head is formed with a notch operative to prevent the lateral escape of the connector during the bending operation.

5. Apparatus according to claim 2 in which each of said arms is adjustably and pivotally connected to a longitudinal movable member at a point remote from the pivot axis and the associated bending and severing head, there being two such members parallel with each other and movable simultaneously in opposite directions.

6. Apparatus according to claim 1 in which means are provided for increasing the length of each connector to be severed, at the expense of the springs connected to it, such means comprising locators defining openings which receive the end parts of said connectors when the central parts of said connectors are received in the grooves, the locators being movable apart from each other to increase the length of said connectors.

7. Apparatus according to claim 6 in which the locators associated with each pair of abutments and pair of heads are also movable transversely of the associated groove in opposite directions so that the end parts of the associated connector are moved towards their final positions before the bending operation occurs.

8. Apparatus according to claim 1 incorporating means for uncoupling these springs which are connected directly to the connectors to be severed, the pair of springs connected to each connector being of opposite hand and being coupled by passing one loop of one spring around a loop of the other spring, such means comprising first displacing means operative to move one of each of said pairs of springs into the other spring of said pair, and second displacing means operative to move each of said other springs transversely of the spring material so as to uncouple the previously coupled loops.

9. Apparatus according to claim 1 in which there is guide means defining a pathway for a length of spring material through the apparatus, said guide means being movable to-and-fro between a position in which the spring material is free to move through the guide means and a position in which those connectors of the spring material which are to be severed are moved into the grooves between the abutments.

References Cited

UNITED STATES PATENTS

| | | | |
|---|---|---|---|
| 213,482 | 3/1879 | Wildermuth | 72—137 |
| 3,370,619 | 2/1968 | Docker | 140—3 |

CHARLES W. LANHAM, Primary Examiner

LOWELL A. LARSON, Assistant Examiner

U.S. Cl. X.R.

72—331